March 21, 1933.   L. D. COBB   1,902,620
BEARING AND SEAL THEREFOR
Filed Aug. 25, 1930
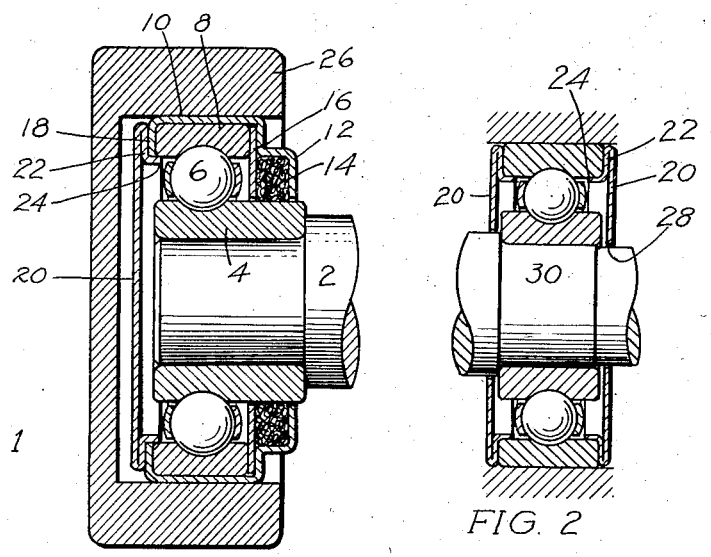
FIG. 1
FIG. 2
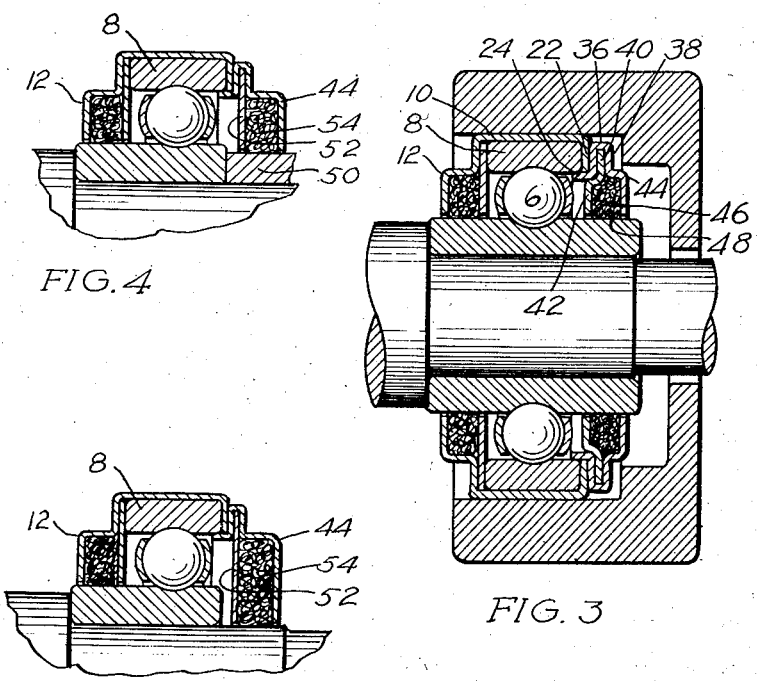
FIG. 4
FIG. 3
FIG. 5
INVENTOR:
LELAND D. COBB,
BY
HIS ATTORNEY.

Patented Mar. 21, 1933

1,902,620

UNITED STATES PATENT OFFICE

LELAND D. COBB, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING AND SEAL THEREFOR

Application filed August 25, 1930. Serial No. 477,589.

This invention relates to bearings and seals therefor and comprises all the features of novelty herein disclosed. An object of the invention is to provide an improved unit-handling bearing and detachable seal. Another object is to provide improved sealing devices for closing the ends of an antifriction bearing.

To these ends and also to improve generally upon devices of the character indicated the invention consists in the various matters hereinafter described and claimed.

Fig. 1 is a cross-sectional view of a sealed up bearing and its mounting.

Fig. 2 is a cross-sectional view of a modified bearing and seal.

Fig. 3 is a cross-sectional view of another modification.

Fig. 4 is a similar view of a slight modification of Fig. 3.

Fig. 5 is a similar view of still another modification.

The numeral 2 indicates a shouldered shaft on which is pressed an inner race ring 4 of an antifriction bearing herein shown as having a row of balls 6 and an outer race ring 8. A sheet metal casing or shell 10 encloses the outer race ring, one end of the shell having a bent or cupped portion 12 enclosing a sealing washer 14 which is also retained laterally by a plain washer 16 engaging the end of the outer race ring and held by the bent portion of the shell. The sealing washer 14 engages a finished face on the outer periphery of the inner race ring 4 which is axially extended beyond the outer race ring and through the end of the shell. The other end of the shell has a holding flange 18 bent down against the opposite end of the outer race ring, preferably terminating about in line with the inner surface of the latter.

A closure plate is detachably carried by the outer race ring and comprises a flat circular wall or body portion 20 extending nearly to the periphery of the bearing, a web 22 bent back inwardly from the outer edge of the body portion and engaging flatwise against the flange 18, and an axially extending lip or flange 24 which is yieldable and has a diameter to allow it to be forced axially inside the flange 18 and preferably also into the outer race ring. The body portion 20 is spaced by both the web 22 and the flange 18 from the inner race ring and the web also acts as a stop to limit the axial movement of the plate towards the bearing. The bend where the web joins the body portion in conjunction with the bend for the flange 18 facilitates removal of the closure plate as by making a little V which will guide a sharp pointed tool between said members. The bearing and shell have the closure plate assembled with them for shipment and completely protect the bearing parts from foreign matter and retain the lubricant. When ready to mount the bearing on the shaft, the closure plate is readily pried off temporarily to allow the inner race ring to be pressed on the shaft, the closure plate then being readily snapped on again merely by axial pressure. The assembled shaft bearing and closure is mounted in any suitable way in a cupped frame or housing 26.

Fig. 2 indicates the closure plate as attached to a bearing having no shell and no extension on the inner race ring. In this instance the body portion 20 is also shown with an opening 28 for a shaft 30. The closure plate or washer will have running clearance with the end of the inner race ring by reason of the web 22 which acts as a spacer.

Fig. 3 shows a modification wherein the closure plate has a channel or groove formed by walls 36 and 38 which receive and hold a retaining washer 40. The washer 40 preferably has an inwardly offset or cupped portion 42 and the closure plate has an outwardly offset or cupped portion 44 to receive a felt washer 46. In this instance, the inner race ring is axially extended beyond the outer race ring at both ends, the felt washer 46 running on the smooth periphery 48 of the extension. The offset 42 allows the insertion of a felt without unduly deepening the offset 44. Thus both ends of the bearing are closed by sealing members contained within the width of the bearing.

In Fig. 4, the closure plate and its washer are carried down close to a spacing sleeve 50 carried by the supporting shaft and forming a non-integral extension of the inner race ring. The washer 52 is straight and the cupped portion 44 is deeper than in Fig. 3 to receive a felt 54.

In Fig. 5, the washer 52 and the cupped portion 44 are carried down close to the supporting shaft beyond the end of the inner race ring while the felt washer 54 runs on the shaft.

I claim:

1. In a unit-handling antifriction bearing and seal, an inner race ring, an outer race ring, a series of rolling elements between the race rings, and a closure plate detachably carried by the bearing to close the space between the race rings, said plate comprising a circular body portion extending alongside the end of the bearing, a web bent inwardly from the outer edge of the body portion and abutting against the end of the bearing to hold the body portion spaced therefrom, and means for securing the web to one of the race rings; substantially as described.

2. In a unit-handling antifriction bearing and seal, an inner race ring, an outer race ring, a series of rolling elements between the race rings, and a closure plate detachably carried by the bearing to close the space between the race rings, said plate comprising a circular body portion extending alongside the end of the bearing, a web bent inwardly from the outer edge of the body portion and abutting against the end of the bearing to hold the body portion spaced therefrom, and a yieldable flange extending axially from the web to enter between the race rings and frictionally engaging one of them; substantially as described.

3. In a unit-handling antifriction bearing and seal, an inner race ring, an outer race ring, a series of rolling elements between the race rings, a shell enclosing the outer race ring and having a flange at one end of said ring, and a closure plate detachably carried by the bearing to close the space between the race rings, said plate comprising a circular body portion extending alongside the end of the bearing, a web turned inwardly from the periphery of the body portion and abutting against the flange of said shell to hold the body portion spaced from the race rings, and a yieldable flange extending axially from the web and engaging the edge of said shell flange; substantially as described.

4. In a unit-handling antifriction bearing and seal, an inner race ring, an outer race ring, a series of rolling elements between the race rings, and a closure plate detachably carried by the bearing to close the space between the race rings, said plate comprising a flat circular body portion arranged adjacent to the end of the bearing, a web folded back along the body portion and engaging the bearing to hold the body portion spaced from the race rings, and a yieldable flange extending axially from the web to frictionally engage one of said race rings; substantially as described.

5. In a unit-handling antifriction bearing and seal, an inner race ring, an outer race ring, a series of rolling elements between the race rings, and a closure plate detachably carried by the bearing to close the space between the race rings, said plate comprising a circular body portion arranged adjacent to the end of the bearing, a web bent back from the body portion and engaging the bearing to hold the body portion spaced from the outer race ring, a yieldable flange extending axially from the web to frictionally engage said race ring, a sealing washer, and the body portion also having a cupped portion enclosing the sealing washer; substantially as described.

6. In a unit-handling antifriction bearing and seal, an inner race ring, an outer race ring, a series of rolling elements between the race rings, and a closure plate detachably carried by the bearing to close the space between the race rings, said plate comprising a circular body portion arranged adjacent to the end of the bearing, a web bent inwardly from the outer edge of the body portion and engaging the bearing to hold the body portion spaced from the outer race ring, means for attaching the web to the outer race ring, the body portion also having a cupped portion, and the inner race having an axial extension surrounded by said cupped portion; substantially as described.

7. In a unit-handling antifriction bearing and seal, an inner race ring, an outer race ring, a series of rolling elements between the race rings, the inner race ring being axially extended beyond both ends of the outer race ring, and a closure plate detachably carried by the bearing to close the space between the race rings, said plate comprising a circular body portion arranged adjacent to the end of the bearing, a web bent back from the body portion and engaging the bearing to hold the body portion spaced from the end of one of the race rings, means for attaching the web to said race ring, the body portion also having a cupped portion surrounding an extended end of the inner race ring, and means carried by the outer race ring and closely surrounding the other extended end of the inner race ring; substantially as described.

8. In a unit-handling antifriction bearing and seal, an inner race ring, an outer race ring, a series of rolling elements between the race rings, and a closure plate detachably carried by the bearing to close the space between the race rings, said plate comprising a circular body portion arranged adjacent to the end of the bearing, a web bent back in spaced relation to the body portion to form a groove therewith, the web engaging the bearing to hold the body portion spaced from the outer race ring, means for attaching the web to the outer race ring, a washer entering said groove, and the body portion having a cupped portion outside said washer to form a sealing groove therewith; substantially as described.

9. In a unit-handling antifriction bearing and seal, an inner race ring, an outer race ring, a series of rolling elements between the race rings, and a closure plate detachably carried by the bearing to close the space between the race rings, said plate comprising a circular body portion arranged adjacent to the end of the bearing, a web bent back in spaced relation to the body portion to form a groove therewith, the web engaging the bearing to hold the body portion spaced from the outer race ring, means for attaching the web to the outer race ring, a washer entering said groove and having a cupped portion, the body portion having a co-operating cupped portion, and a sealing washer in the groove formed by said cupped portions; substantially as described.

10. In a device of the character described, a closure plate comprising a cupped body portion, a web bent back in spaced relation to the body portion to form a groove therewith, a retaining washer held in said groove and extending in spaced relation to said cupped portion, and a sealing washer between said retaining washer and said cupped portion; substantially as described.

11. In a device of the character described, a closure plate comprising a cupped body portion, a web bent back in spaced relation to the body portion to form a groove therewith, a retaining washer held in said groove and extending in spaced relation to said cupped portion, and a yieldable flange extending axially from the web; substantially as described.

In testimony whereof I hereunto affix my signature.

LELAND D. COBB.